D. G. Canfield,
Circular Saw Mill.
Nº 66,947.    Patented July 23, 1867.
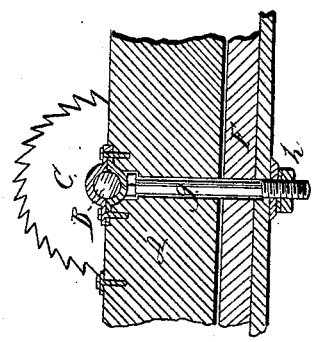
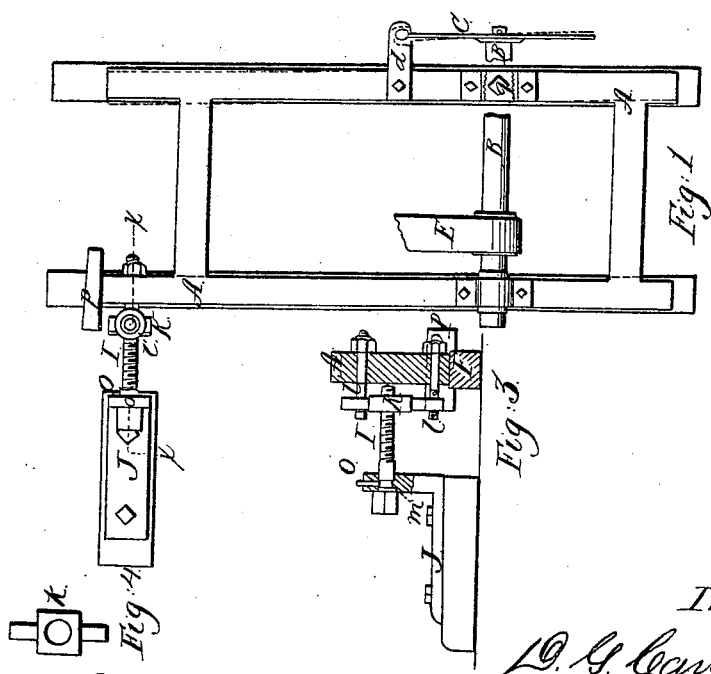
Witnesses: Robt Heneage
Henry Spendelow
Inventor:
D. G. Canfield
by J. Fraser &c.
Attys

United States Patent Office.

DAYTON G. CANFIELD, OF NIAGARA FALLS, NEW YORK.

Letters Patent No. 66,947, dated July 23, 1867.

---

IMPROVEMENT IN CIRCULAR-SAWING MACHINES.

---

*The Schedule referred to in these Letters Patent and making part of the same.*

---

TO ALL WHOM IT MAY CONCERN:

Be it known that I, DAYTON G. CANFIELD, of Niagara Falls, in the county of Niagara, and State of New York, have invented a new and improved Pivot-Frame for Adjusting the Lead of Circular Saws; and I do hereby declare that the following is a full and exact description thereof, reference being had to the accompanying drawings, making part of this specification, in which—

Figure 1 is a plan of my improvements.

Figure 2 is a fragmentary view in section showing the manner of pivoting the frame.

Figure 3 is a detached section of the adjusting device in plane of line $x\ x$, fig. 1.

Figure 4 is a view of the self-adjusting nut K.

Like letters of reference designate corresponding parts in all the figures.

In sawing lumber with a circular saw it becomes necessary to frequently change the adjustment or "lead" of the saw to adapt it to different kinds of timber, the softer and more yielding varieties pressing the hardest against the saw, and requiring the greatest lead or adjustment towards the timber. Hitherto this has been effected by adjusting the boxes of the saw-mandrel by means of set-screws and by changing the saw-guide; and it is one of the most difficult and annoying things that a sawyer has to contend with, requiring not unfrequently hours to make the precise change required. As the saw has to be at rest while this adjustment is made it involves a great loss, resulting from the stopping of the mill, and from the employees remaining idle during the process.

It is the object of my invention to obviate these difficulties and prevent this loss by a method of adjustment which consists in pivoting the frame which supports the saw-mandrel so that the saw can be readily adjusted at any time, even while in motion, by simply turning a screw at one corner of the frame, and which effects the required change by slightly turning the frame on its pivot, all as hereinafter fully set forth.

In the drawings, A represents a rectangular frame, B, the shaft or saw-mandrel mounted near one end; C, the saw; $d$, the saw-guide, and E the driving-belt. This frame is pivoted in any suitable manner to a base, F, of similar form, at a point as near the centre of the saw as possible, being shown in the drawings as pivoted by means of a bolt, $g$, having its head countersunk beneath the box of the mandrel and extending downward though the frame, base, and floor, and provided with a nut, $h$, and washer at its lower end, (fig. 2.) By turning the frame thus pivoted it is evident that the saw mounted on the end of mandrel B will be adjusted accordingly to a greater or less lead, owing to the direction in which it is turned. For this purpose I prefer to employ at the corner diagonally opposite a screw-bolt, I, which passes through any suitable bearing piece, J, firmly bolted to the floor, and screws into a self-adjusting nut, K, mounted in two eye-bolts, $l\ l$, which secure it to the end of the frame, as represented in figs. 1 and 3. The bolt I, where it passes through the bearing J, is provided with an annular groove, $m$, fig. 3, in which fits the end of a small pin, $o$, inserted in the bearing from the top, that allows the screw to freely turn, but prevents any longitudinal movement. It is obvious that by simply turning this bolt the end of the frame will be swung around, thereby adjusting the lead of the saw as required, as shown in red lines. The nut K having its bearings in the two eye-bolts $l\ l$, readily adjusts itself therein as the frame is moved, so as to always maintain the same relative position to the screw I, which thereby insures the easy traverse of the latter through it. When the frame and saw have been properly adjusted a wedge, $p$, or equivalent, may be inserted in a suitable recess formed in the top of frame F in such a manner as to wedge against the end of the frame A, as shown in figs. 1 and 3, and hold it firmly, relieving the screw-threads of the strain produced by the traction of the belt and vibration of the running.

I do not confine myself to the above-described means for adjusting the end of the frame A, as other devices may be employed to accomplish the same purpose.

It is evident from the aforegoing description that the saw can be readjusted even while in motion by giving the bolt I a turn in either direction, as may be required. The entire adjustment being effected by the single screw-bolt enables the saw to be adjusted with a precision that cannot be attained by the ordinary method, except after repeated trials, whereas by the use of my improvement after the saw has been set in motion, if the adjustment is found to be incorrect it can be changed while in motion and the proper lead attained much more readily than when the saw is still. It also saves the necessity of changing the saw-guide $d$ with every adjustment of the saw, as, from being fixed to the frame, it moves with it and always occupies the same relative position to the saw.

My improvement not only saves the delay of stopping the mill and the loss resulting from the hands remaining idle during the usual tedious operation of changing the adjustment, but also enables cheaper boxes to be employed for the mandrel, as well as saving the cost of the set-screws and their attachments that would otherwise be required.

I am aware that saws have been made adjustable by means of swinging frames operated by screws working through an arm on the movable frame and engaging with a rigid nut immovably fixed to some bearing; and also that the adjustment has, in other instances, been effected by cams and levers, and these I do not claim, as my invention consists in the employment with a movable mandrel-frame of an adjusting-screw operating in a fixed collar or bearing through a swivel-nut which accommodates itself to the varying positions of the frame without strain or binding upon any of the operative parts.

What I claim as my invention, and desire to secure by Letters Patent, is—

The combination of the adjustable mandrel-frame A, screw-bolt I, swivel-nut K, and bearing J, constructed, arranged, and operating substantially as and for the purposes set forth.

In witness whereof I have hereunto signed my name in the presence of two subscribing witnesses.

DAYTON G. CANFIELD.

Witnesses:
    JAY HYATT,
    ALBERT HAIGHT.